US009980464B2

United States Patent
Bin

(10) Patent No.: US 9,980,464 B2
(45) Date of Patent: May 29, 2018

(54) ORBIT-TYPE CAT TOY WITH SENSING FUNCTION

(71) Applicant: Jiangsu Zhongheng Pet Articles Joint-Stock Co., Ltd., Jiangsu (CN)

(72) Inventor: Qiu Bin, Jiangsu (CN)

(73) Assignee: Jiangsu Zhongheng Pet Articles Joint-Stock Co., Ltd., Yancheng, Jiangsu (CN)

(*) Notice: Subject to any disclaimer, the term of this patent is extended or adjusted under 35 U.S.C. 154(b) by 175 days.

(21) Appl. No.: 15/171,974

(22) Filed: Jun. 2, 2016

(65) Prior Publication Data

US 2016/0360728 A1    Dec. 15, 2016

(30) Foreign Application Priority Data

Jun. 2, 2015  (CN) .......................... 2015 1 0295345

(51) Int. Cl.
*A01K 29/00* (2006.01)
*A01K 15/02* (2006.01)

(52) U.S. Cl.
CPC .................................. *A01K 15/025* (2013.01)

(58) Field of Classification Search
CPC .... A01K 15/025; A01K 15/027; A01K 15/02; A01K 15/021; A01K 15/024; A63F 7/3622
See application file for complete search history.

(56) References Cited

U.S. PATENT DOCUMENTS

| 5,680,831 A * | 10/1997 | Udelle | A01K 13/00 119/609 |
| 5,875,736 A * | 3/1999 | Udelle | A01K 15/025 119/706 |
| 6,591,785 B1 * | 7/2003 | Boshears | A01K 15/024 119/706 |

* cited by examiner

*Primary Examiner* — Kristen C Hayes
(74) *Attorney, Agent, or Firm* — Liang Legal Group, PLLC

(57) ABSTRACT

An orbit-type cat toy with a sensing function includes a chassis with a circular orbit (track) and a small toy capable of rolling along the circular orbit. A plurality of sensing devices are evenly distributed along the circumference of the chassis, and an inside of the chassis is provided with a signal sending module configured to send a signal after a sensing device is triggered. The bottom of the small toy is provided with a roller wheel, and the inside of the small toy is provided with a motor to drive the roller wheel to rotate. The small toy further includes a signal receiving module, a calculation module, a comparison module, and a control module to control the motor to rotate.

8 Claims, 2 Drawing Sheets

ORBIT-TYPE CAT TOY WITH SENSING FUNCTION

CROSS-REFERENCE TO RELATED APPLICATIONS

This Application claims the priority of Chinese Patent Application No. 201510295345.9, filed on Jun. 2, 2015, the disclosure of which is incorporated by reference in its entirety.

TECHNICAL FIELD

The present invention relates to a pet toy, and more particularly, to an orbit-type cat toy with a sensing function.

BACKGROUND ART

Feline is a kind of animal that hides in the daytime and comes out at night, with little movement. More particularly, a household pet cat moves less. In order to make the household pet cat healthier and more active, a toy becomes a necessary thing for raising cat. Moreover, toys are more necessary for a cat rather than a dog. The cat is playful by nature and grows up in nature playing.

At present, there are multiple turnplate toys for cats on the market, most of which require the cats to poke balls with their claws, so that the balls will rotate to attract the cats to play. However, this method cannot attract the pet cat to play initiatively for a long term and requires a stronger conscious activity, which makes it very difficult for the pet cat to persist. Therefore, an expected training effect cannot be achieved.

SUMMARY OF THE INVENTION

Aiming at the foregoing problems, an object of the present invention is to provide an orbit-type cat toy with a sensing function, which can control the small toy to move forward or backward according to the forward distance or backward distance between the triggered sensing device and the small toy.

An object of the invention may be implemented as follows.

An orbit-type cat toy with a sensing function includes a chassis with a circular orbit and a small toy capable of rolling along the circular orbit.

A plurality of sensing devices (sensors) are evenly distributed along the circumference of the chassis, and the inside of the chassis is provided with a signal sending module configured to send a sensed signal after the sensing devices are triggered.

The bottom of the small toy is provided with a roller wheel, and the inside of the small toy is further provided with a motor for driving the roller wheel to rotate. In addition, a signal receiving module, a calculation module, a comparison module, and a control module are provided for controlling the motor to rotate.

The signal receiving module is configured to receive a sensed (detected) signal sent by the sending module.

The calculation module calculates, respectively, the forward distance and the backward distance between the small toy and the triggered sensing device according to the sensed signal.

The comparison module is configured to compare the forward distance and the backward distance, and send a control signal to the control module according to the comparison result.

The control module controls the forward and reverse rotation of the motor according to the control signal so as to drive the roller wheel to move the small toy forward or backward.

Wherein, the head and the tail of the small toy each are respectively provided with a signal receiving module, and the calculation module calculates the forward distance and the backward distance according to a time difference between the time of receipt of the signal at the two signal receiving modules.

Wherein, a control method in accordance with one method of the invention is as follows:

1) generating a sensed signal by the sensing device after being triggered, and sending the sensed signal to the two signal receiving modules on the small toy through the signal sending module;

2) calculating, by the calculation module, the forward distance and the backward distance between the small toy and the triggered induction device according to the receiving time difference at the two signal receiving modules on the reception of the signal;

3) comparing, by the comparison module, the forward distance and the backward distance, and sending a control signal to the control module according to the comparison result; and 4) when the forward distance is greater than the backward distance, instructing, by the control module, the motor to rotate forwardly according to the control signal, so as to drive the roller wheel to move the small toy forward; and when the forward distance is less than the backward distance, instructing, by the control module, the motor to rotate reversely (backwardly) according to the control signal, so as to drive the roller wheel to move the small toy backward.

Wherein, the circular orbit has an alternating think (high) and thin (low) profile sections.

Wherein, a plurality of troughs (the low sections between the two high sections) of the circular orbit are each provided with a shelter (cover) that a small toy can pass through.

Wherein, the shelter is a hemispherical shell arched upwards, and the hemispherical shell has openings forming a passageway along the moving direction of the small toy for the small toy to pass through.

Wherein, a sounding device is installed in the chassis, and makes sounds after any sensing device is triggered.

Wherein, the sensing device (sensor) is an infrared sensor.

Embodiments of the present invention have one or more of the following advantageous effects: the present invention controls a small toy to move forward or backward according to the forward distance or backward distance between the triggered sensing device and the small toy, integrates a sounding function at the same time, can attract the attention of the cat more effectively, and improve the concentration of the cat on the toy.

DETAILED DESCRIPTION

Embodiments of the invention will be further described in details hereinafter with reference to the drawings and specific examples.

Figure 1:
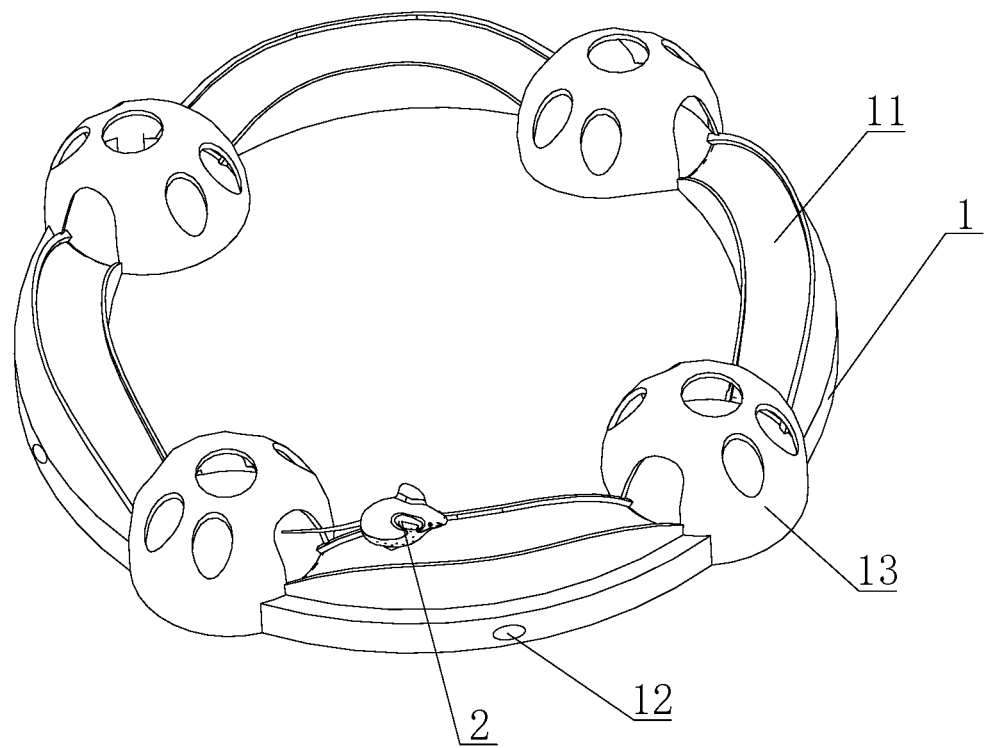
FIG. 1 is a structure diagram of one embodiment of the invention.

As shown in FIG. 1, an orbit-type cat toy with a sensing function includes a chassis 1 with a circular orbit 11 and a small toy 2 capable of rolling along the circular orbit 11.

To implement the sensing function of the toy, a plurality of sensing devices (sensors) 12 are evenly distributed along the circumference of the chassis 1. The inside of the chassis 1 is provided with a signal sending module configured to send a signal after the sensing device 12 is triggered. The bottom of the small toy 2 is provided with a roller wheel, and the inside of the small toy 2 is provided with a motor for driving the roller wheel to rotate. A calculation module, a comparison module and a control module are also provided for controlling the motor to rotate. The head and the tail of the small toy 2 are respectively provided with a signal receiving module. Wherein, an infrared sensor can be specifically selected as the sensing device 12.

Figure 2:
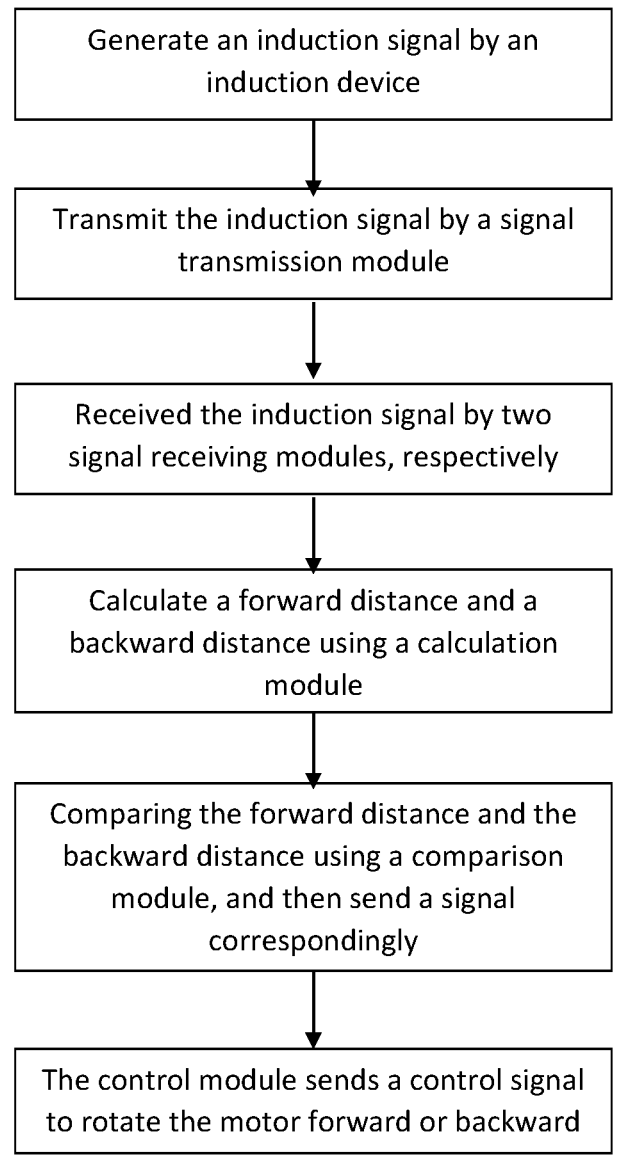
FIG. 2 is a control flow chart of one method of the invention.

As shown in FIG. 2, a control method of the present invention is as follows:

1) when a cat is close to the sensing device 12, the sensing device 12 will be triggered to generate a signal, and send the signal to the two signal sending modules on the small toy 2 through the signal sending module.

2) The calculation module calculates the forward distance and the backward distance between the small toy 2 and the triggered sensing device 12 according to the time difference of the receipt of the signal at the two signal receiving modules.

3) The comparison module compares the forward distance and the backward distance, and sends a control signal to the control module according to the comparison result.

4) When the forward distance is greater than the backward distance, instructing, by the control module, the motor to rotate forwardly according to the control signal, so as to drive the roller wheel to drive the small toy 2 to move forward.

When the forward distance is less than the backward distance, the control module instructs the motor to rotate reversely according to the control signal, so as to drive the roller wheel to drive the small toy to move backward.

Through the above control method, when the cat is close to the small toy 2, the small toy 2 rolls along a direction to move away from the cat to have interactions between the toy and the cat, thereby increasing the interesting property of the toy to attract the cat to play.

According to the nature of the cat, a mouse shape may be selected for the small toy 2. Moreover, a sounding device 12 may be installed in the chassis 1, wherein the sounding device 12 may imitate the squeaks of a mouse. When any sensing device 12 is triggered, the sounding device 12 makes sounds so as to enhance the attractiveness of the present invention to the cat.

In order to further increase the interesting property of the present invention, the circular orbit 11 may be designed to have up and down (hill and valley) profiles on the circular orbit (track). A plurality of troughs (valleys) of the circular orbit 11 are respectively provided with an shelter (covering) 13 through which the small toy 2 can pass through. The shelter 13 can be specifically designed into a hemispherical shell, which is arched upwards, and the hemispherical shell have openings to form a passageway along the moving direction of the small toy 2 for the small toy to pass through. By the above design, the small toy 2 is alternately exposed or hidden (in the shelter) when rolling on the circular orbit (track) 11, which is similar to a game of peekaboo, thereby enhancing the concentration/interest of the cat while playing.

What is claimed is:

1. An orbit-type cat toy with a sensing function, comprising a chassis with a circular orbit and a small toy capable of rolling along the circular orbit,
   wherein a plurality of sensing devices are evenly distributed along the circumference of the chassis, and an inside of the chassis is provided with a signal sending module configured to send a signal after a sensing device is triggered;
   wherein a bottom of the small toy is provided with a roller wheel, and an inside of the small toy is provided with a motor to drive the roller wheel to rotate, wherein the small toy further comprises a signal receiving module, a calculation module, a comparison module, and a control module for controlling the motor to rotate;
   wherein the signal receiving module is configured to receive a signal sent by the sending module;
   wherein the calculation module calculates a forward distance and a backward distance between the small toy and the triggered sensing device according to the signal;
   wherein the comparison module is configured to compare the forward distance and the backward distance, and send a control signal to the control module according to the comparison result; and
   wherein the control module controls the forward and reverse rotation of the motor according to the control signal so as to drive the roller wheel to move the small toy forward or backward.

2. The orbit-type cat toy with a sensing function according to claim 1, wherein a head and a tail of the small toy are respectively provided with a signal receiving module, and the calculation module calculates the forward distance and the backward distance according to a time difference of receipt of the signal at the two signal receiving modules.

3. The orbit-type cat toy with a sensing function according to claim 2, wherein the toy includes a program having instructions for performing the steps of:
   1) generating a sensing signal by a sensing device after being triggered, and sending the signal to the two signal receiving modules on the small toy (2) through the signal sending module;
   2) calculating, by the calculation module, the forward distance and the backward distance between the small toy and the triggered sensing device according to a time difference of receipt of the signal at the two signal receiving modules;
   3) comparing, by the comparison module, the forward distance and the backward distance, and sending a control signal to the control module according to the comparison result; and
   4) when the forward distance is greater than the backward distance, instructing, by the control module, the motor to rotate forwardly according to the control signal, so as to drive the roller wheel to move the small toy forward; and
   when the forward distance is less than the backward distance, instructing, by the control module, the motor to rotate reversely according to the control signal, so as to drive the roller wheel to move the small toy backward.

4. The orbit-type cat toy with a sensing function according to claim 1, wherein the circular orbit (11) has an alternating hill-and-valley profile.

5. The orbit-type cat toy with a sensing function according to claim 4, wherein a plurality of valleys of the circular orbit are respectively provided with covering, through which the small toy can pass.

6. The orbit-type cat toy with a sensing function according to claim 5, wherein the covering is a hemispherical shell arched upwards, and the hemispherical shell has openings forming a passageway along a moving direction of the small toy to allow the small toy to pass through.

7. The orbit-type cat toy with a sensing function according to claim 1, wherein a sounding device is installed in the chassis (1), and makes a sound after any sensing device is triggered.

8. The orbit-type cat toy with a sensing function according to claim 1, wherein the sensing device is an infrared sensor.

* * * * *